Oct. 24, 1944.  H. WIEKERT  2,361,341
SWEEP RACK
Filed Aug. 30, 1943  3 Sheets-Sheet 3
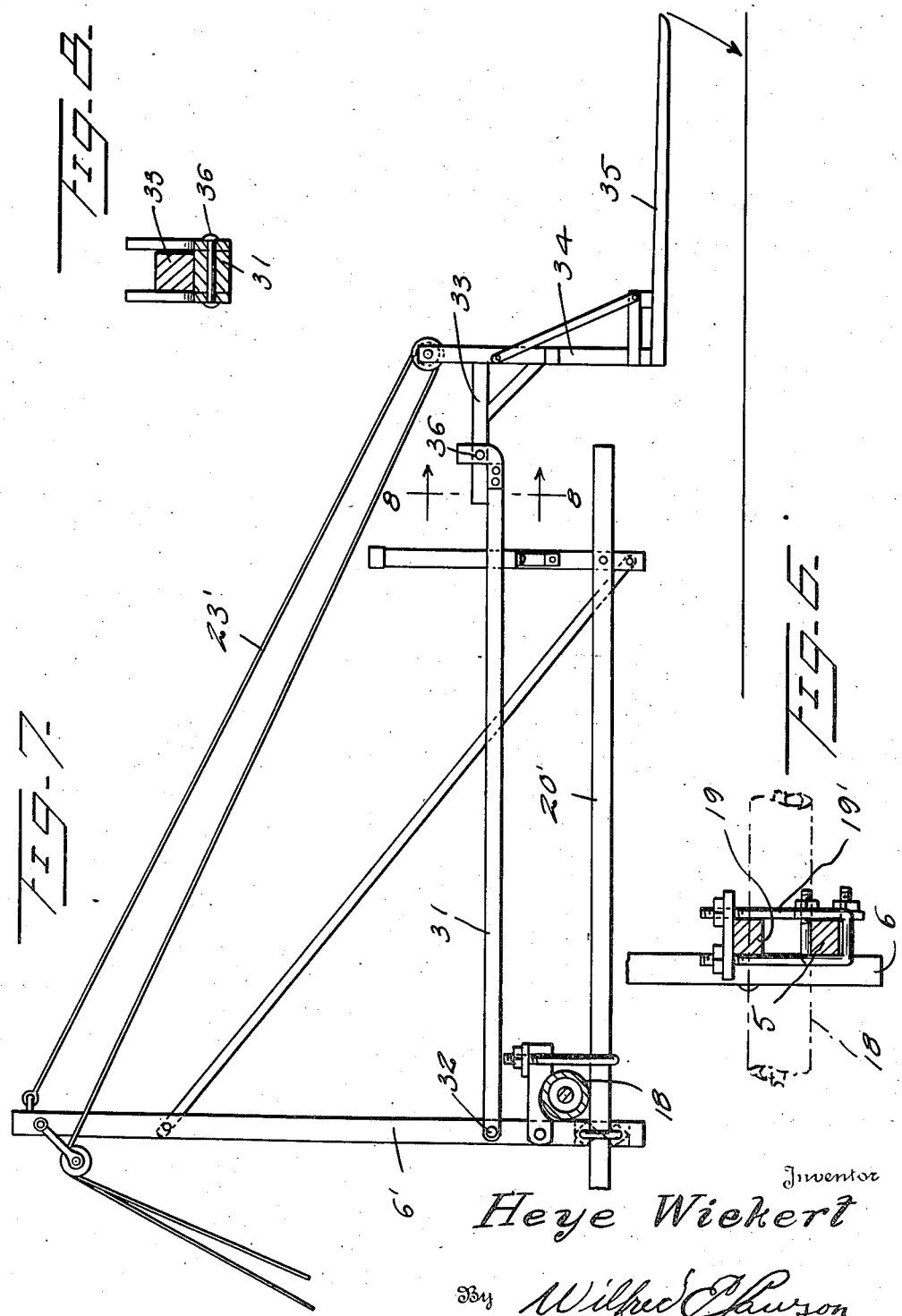
Inventor
Heye Wiekert
By Wilfred E. Lawson
Attorney Patented Oct. 24, 1944

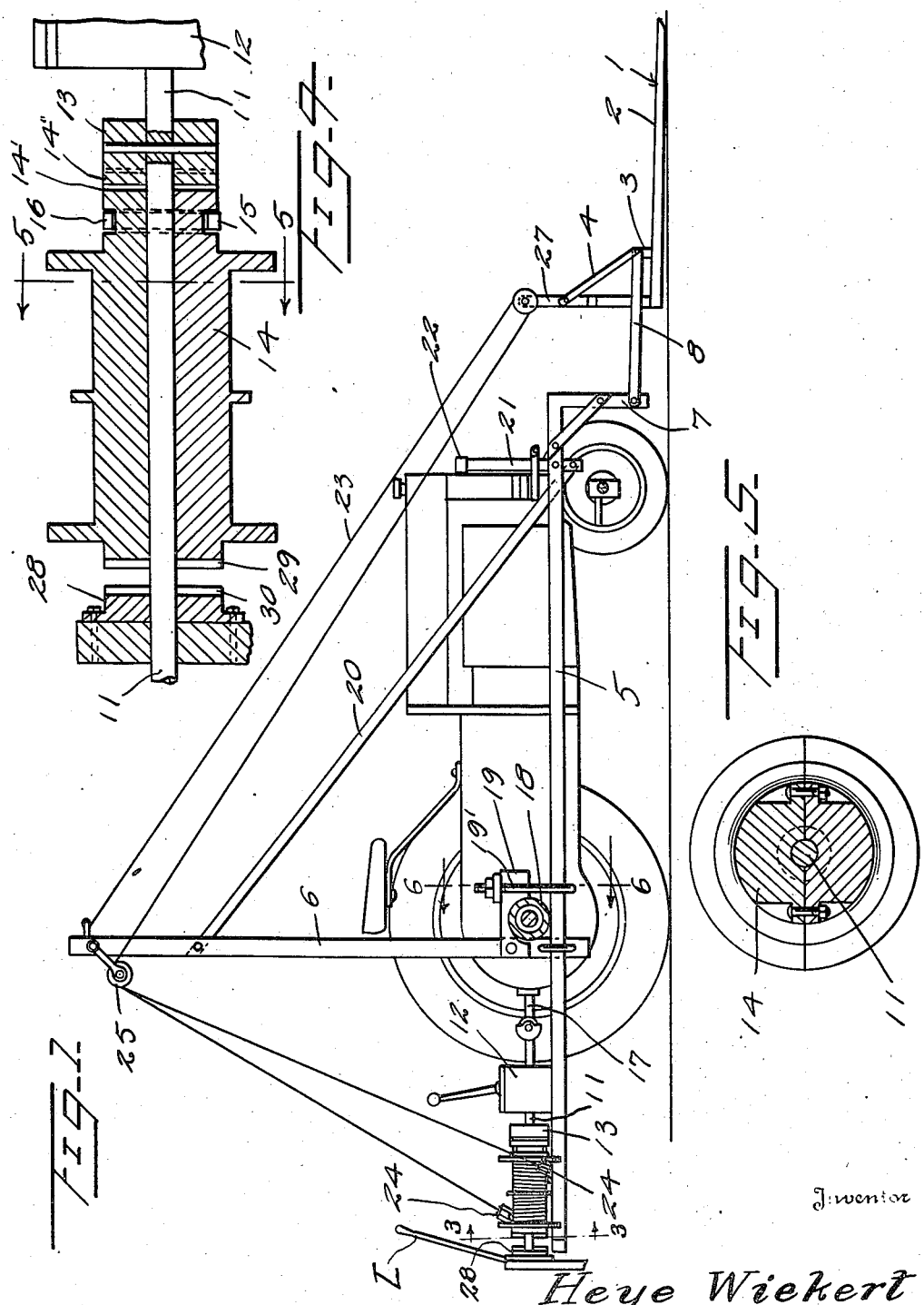

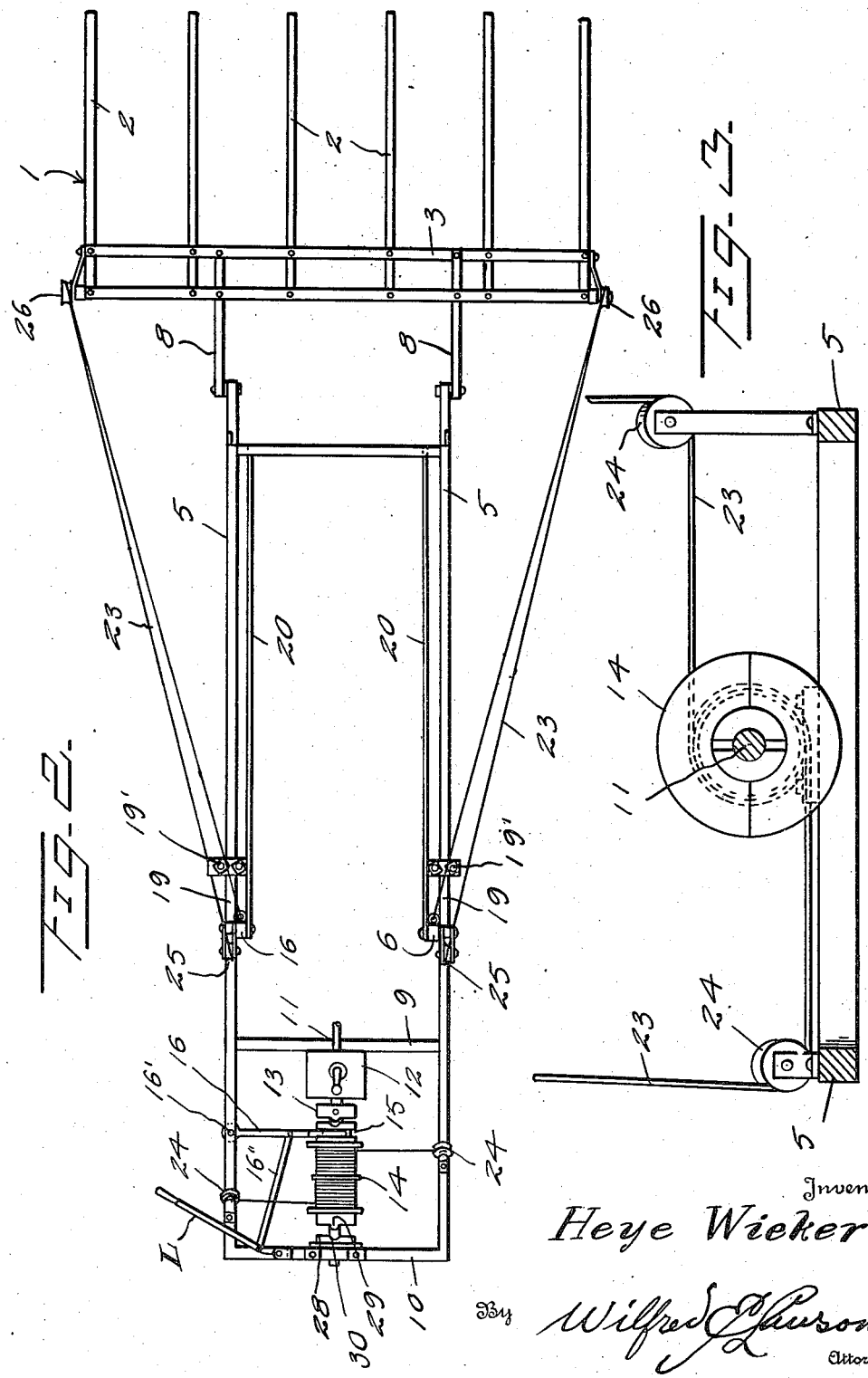

2,361,341

UNITED STATES PATENT OFFICE 2,361,341

SWEEP RACK

Heye Wiekert, Beason, Ill.

Application August 30, 1943, Serial No. 500,563

8 Claims. (Cl. 214—131)

This invention is directed to an improvement in sweep racks, and particularly to a means for operating such racks with a view to their effective pick up, transportation and selective delivery of the material.

The sweep rack of the present invention includes a frame having relatively long teeth or tines, with a stop gate at the rear to retain the contents of the rack when raised for transferring the load, the rack being mounted for lowering or raising at will to either pick up a load or deliver the same to a selected depository.

The invention has a further object in the provision of means whereby the rack may be raised to a height to permit the tilting to a position to deliver the load on an elevated depository, such as a wagon, hay stack, or the like, the rack when in such elevated position being capable of being tilted for gravital or other delivery.

The invention also has for its object the provision of means whereby the rack may be carried by and operated from a tractor or truck frame, with the operating means controllable by the driver to compel the desired actuation of the rack for pick-up or delivery.

The invention is illustrated in the accompanying drawings, in which:

Figure 1 is a view showing one embodiment of the present invention in side elevation and applied to a tractor;

Figure 2 is a view in top plan of the structure of Figure 1 removed from the tractor;

Figure 3 is a transverse section taken substantially on the line 3—3 of Figure 1;

Figure 4 is a longitudinal section on an enlarged scale through the cable drum and the clutches at the ends thereof;

Figure 5 is a transverse section on the line 5—5 of Figure 4;

Figure 6 is a sectional view on the line 6—6 of Figure 1;

Figure 7 is a view in side elevation of a modification or second embodiment of the invention; and Figure 8 is a section on the line 8—8 of Figure 7.

The sweep rack proper, indicated at 1, is made up of relatively long, preferably pointed teeth or tines 2, rigidly connected near their rear ends by a cross bar 3, the rear ends of the teeth being provided with an upstanding skeleton frame 4, forming a rear stop gate to prevent the contents of the rack from being discharged rearwardly when the rack is tilted.

The showing in Figure 1 indicates the use of the sweep rack with a tractor. The specific structure includes opposed parallel sills 5, to each of which is secured an upright 6. The forward ends of the sills 5 have depending sections 7 to which are swingingly secured bars 8 connected to the cross bar 3 of the sweep rack. The swinging support for the bars 8 provides the pivotal mounting on which the sweep rack is moved.

The sills 5 are provided with a transverse beam 9 and with a rear end beam 10, and an auxiliary drive shaft 11 is supported in appropriate hanger bearings carried by these beams. A transmission 12 cooperating with shaft 11 controls in the usual way direct and reverse drive of the shaft. A clutch member 13 is secured on the drive shaft 11 immediately behind the transmission, and a split drum 14 is supported on the drive shaft and normally free of any drive connection with the shaft.

The drum 14 and the clutch member 13 have formed upon their opposing faces cooperating lugs and recesses 14' and 14'' whereby, when the drum is shifted on the shaft, it may be operatively coupled with the shaft through the clutch member 13 or disconnected from the shaft, as will be readily apparent upon reference to Figure 4. The drum is preferably made in two sections and bolted together, after assembling on the shaft, and at the end nearest the clutch member 13 is provided with an annular groove 15 to receive the free or forked end of a shifting fork 16, the opposite end of which is pivotally attached to the frame or an adjacent fixed member. Operatively connected with the fork 16 by a link 16'' is a control lever L by means of which the fork may be shifted to effect the movement of the drum toward and away from the clutch member 13.

As in the application of the unit to a tractor, the drive is beyond the conventional drive shaft of that mechanism, the auxiliary drive shaft 11 is necessary. To operate this shaft, it is provided with a universally connected stub shaft 17, the forward end of which is formed to cooperate with the usual sleeve of a power take-off of a tractor. This connection will be conventional and detailed disclosure of such is not necessary.

At the opposite end of the drum 14 there is fixed to the frame cross member 10 a clutch plate 28 and the face of this clutch plate and the adjacent face or end of the drum 14 have cooperating lugs and recesses 29 and 30 whereby, when the drum is shifted a sufficient distance rearwardly from the clutch member 13, it may be locked to the plate 28 and held against rotation. This locking of the drum is made where it is desired to hold the sweep rack raised and at the same time reverse the machine so as to prevent the cables unwinding from the drum and lowering the rack.

The sills 5 are secured to the axle housings 18 of the tractor by disposing the sills beneath such housings with the uprights in contact with such housings. Bars 19, shaped to conform to the housings, are pivotally connected to the uprights and overlie and bear on the housings 18. Clamps of U-form embrace the sills on the side of the housing opposite the uprights, such clamps 19' having a plate connecting their upper ends and secured by bolts. Thus, the sills and connected parts are firmly but removably fixed to the axle housings.

Braces 20 extend from the uprights near their upper ends to the lower ends of vertical bars 21, connected at their upper ends by a cross bar 22 to be bolted to the front end of a tractor frame to provide a support. The sills 5 and connected parts are thus rigidly carried by the tractor frame, and the operating parts are driven by the tractor power in either direction, and the drum selectively driven in either direction at the will of the operator.

The sweep rack operating means includes two cables 23, terminally wound in opposite directions about the drum 14, carried laterally therefrom and over pulleys 24 secured to the sills 5, then up and over pulleys 25, secured to the upper ends of the uprights 5, then down and around pulleys 26 carried by bars 27 secured to the rack, then up and terminally secured to the uprights 5 near their upper ends. The bars 27 are provided to arrange the pulleys 26 a sufficient distance from the end of the rack to insure a proper leverage for the lift of the rack.

As the cables 23 are wound in opposite directions about the drum 14, it is apparent that when the drum is in clutched cooperation and the auxiliary shaft being driven, the cables will act in one turning direction of the drum to lift the free end of the rack on the pivotal mounting of the bars. The opposite turning of the drum will, of course, lower the rack.

In ordinary use of the rack, it may be lowered to pick up a load, raised to clear the ground, and transported in such raised condition to any place of deposit, when the rack may be lowered to discharge the load. It may be desired, however, to bodily elevate the rack so that its discharge may be on a much higher level than usual, as for example in delivering the load to a hay rack, wagon, or other depository.

To provide for this operation, the construction illustrated in Figure 7 is employed wherein a frame is made use of similar to the first described frame, above the side rails 20' of which are disposed the long arms 31 each of which is pivotally attached at its rear end, as at 32, to an upright 6'. Each of these long arms 31 constitutes a lift arm and at their forward ends, each has pivotally attached thereto a short arm 33 which is connected with the rear portion or gate 34 of the rack 35. As shown in Figure 7, the short arm 33 is pivoted at 36 a substantial distance inwardly from its rear end so that such rear end overlaps a portion of the forward end of the lift arm 31 to which it is connected.

With this arrangement, it will be readily seen that when the sweep rack 35 is lowered by the slackening of the cables 23', the short arms 33 will swing downwardly on their pivots 36 to allow the points of the rack to contact the ground. After the rack has been filled or has picked up a load, it is lifted to the horizontal position shown by taking up the cables 23 on the drum (not shown in this figure), and after it reaches horizontal position, further upswinging of the short arms 33 will be prevented due to the engagement of the rear ends thereof with the tops of the long lift arms 31 and further pulling of the cables will then cause the long lift arms 31 to swing up on their pivots 32, whereby the load can be lifted to the desired elevation. After the desired height has been reached for the load, the rack can be tipped slightly by slackening the cable so as to allow the rack to tip down, swinging on the pivot 36. Thus, the loaded sweep rack may be raised by the lift arms to a position well above the bottom of the wagon, for example, and the load readily discharged into the wagon. If desired, suitable catches may be employed to hold the lift arms in elevated position during such operation of the rack.

In the use of the unit with a truck, the sills are clamped to a hanger from the bars of the truck frame and the front ends of the sills suspended from a bar bolted to the bumper of the truck. Here the drive shaft of the truck may serve in place of the auxiliary shaft 11, and the parts of the unit and the operation are as previously described.

Of course, no limitation is intended by any detailed description herein as to size or material of any parts employed, and it is, of course, to be understood that the detailed construction may be varied to an extent to adapt it for use with any special tractor or truck.

What is claimed is:

1. A sweep rack, spaced sills pivotally connected with the rack, uprights rising from the sills, a drive shaft supported at an end by the sills, a drum normally free for axial movement on the shaft, means for connecting the drum and shaft upon axial shifting of the drum, for operative movement of the drum, cables wound in opposite directions about the drum, passed laterally of the drum and over pulleys, then upwardly over pulleys at the upper ends of the uprights, then to and around pulleys on the sweep rack and back to and secured to the uprights.

2. A construction as defined in claim 1, wherein the sills pass under the axle housing of the vehicle, the upright being secured to the sills at one side of and adjacent to said housing, a clamp member secured to each upright and extending across the housing, and a releasable coupling between each clamp member and the adjacent sill and extending across the housing upon the side thereof opposite from the adjacent upright.

3. A sweep rack comprising a frame adapted to be mounted upon a wheeled carrier having a power take-off, a rack pivotally mounted upon the frame, a shaft rotatably mounted on the frame and adapted for connection with said power take-off, a drum slidably mounted upon said shaft, clutch means secured to the shaft, means for shifting the drum axially into and out of operative connection with the clutch means, and cables connected with said rack and with said drum for effecting the swinging of the rack upwardly on its pivot upon the winding of the cables onto the drum.

4. A sweep rack as set forth in claim 3, including a second clutch element fixed against turning adjacent the opposite end of the drum from the first clutch element, and means for establishing an operative coupling between the drum and the second clutch element upon oppositely axially shifting the drum to secure the drum against rotation.

5. A sweep rack comprising a frame designed to be mounted upon a wheeled carrier, a pair of uprights mounted upon the frame, a sweep rack having an upright fence across the rear part thereof, short rearwardly extending arms carried by said fence, long lift arms extending longitudinally of the frame to the forward end thereof and each pivotally attached at its rear end to an upright for vertical swinging, each of said short arms being in overlapping relation with the forward end of a long arm and pivotally attached to the long arm whereby each short arm may have downward swinging movement with respect to the long arm but is limited in its upward swinging movement to parallel relation with the long arm, and means connected with the rack for effecting the upward swinging of the arms.

6. A sweep rack structure comprising a frame designed to enclose a power unit such as a tractor having a power take-off, a rack pivotally supported upon the forward end of the frame for oscillation upon an axis extending transversely of the frame, a shaft rotatably supported upon the frame and adapted for operative connection with said power take-off, a cable drum supported upon the shaft for axial movement, means at one end of the drum forming a clutch member, a clutch member fixed to the shaft adjacent to said one end of the drum for operative connection with the first clutch member, cables connected with the drum to be wound thereon and operatively coupled with the rack to effect oscillation of the rack when wound up on the drum, and a shift means carried by the frame and operatively coupled with the drum to effect axial movement of the drum for bringing together and separating said clutch members.

7. A sweep rack structure as set forth in claim 6, with a second clutch member carried by the drum and upon the other end thereof, and a clutch member fixed to the frame adjacent the said second clutch member, said shift means being effective for the shifting of the drum away from that clutch member which is fixed to the shaft to effect the operative connection of the clutch member upon the other end of the drum with the fixed clutch member whereby to lock the drum against turning.

8. A sweep rack, a frame on which the rack is pivotally mounted, a drive shaft, a drum normally free for both rotary and axial movement on the shaft, a clutch element carried upon each end of the drum, a fixed clutch element at one end of the drum, a clutch element carried by and fixed to the shaft at the other end of the drum for rotation with the shaft, said fixed clutch element and shaft carried clutch element being spaced apart a sufficient distance for the disposition of the drum therebetween and free from connection with both, means for shifting the drum axially for selective clutch connection with the fixed clutch element and with the shaft carried clutch element, and cables wound on the drum and terminally connected to the sweep rack for operating the latter on its pivotal mounting.

HEYE WIEKERT.